(12) United States Patent
Huang et al.

(10) Patent No.: US 8,872,905 B2
(45) Date of Patent: Oct. 28, 2014

(54) MULTI-VIEW STEREOSCOPIC DISPLAY

(75) Inventors: Tzu-Chin Huang, Hsin-Chu (TW);
Hong-Shen Lin, Hsin-Chu (TW);
Chun-Wei Wu, Hsin-Chu (TW);
Lee-Hsun Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 609 days.

(21) Appl. No.: 13/283,590

(22) Filed: Oct. 28, 2011

(65) Prior Publication Data

US 2012/0105953 A1    May 3, 2012

(30) Foreign Application Priority Data

Oct. 29, 2010   (TW) ................................. 99137303 A

(51) Int. Cl.
*H04N 13/04*   (2006.01)
*H04N 9/47*    (2006.01)
*G02B 27/22*   (2006.01)

(52) U.S. Cl.
CPC ................................ *G02B 27/2214* (2013.01)
USPC ......................................................... 348/58

(58) Field of Classification Search
CPC .......... H04N 13/0434; H04N 13/0459; H04N 13/0059; H04N 13/0422; G02B 27/26
USPC .................................................. 348/42–60
See application file for complete search history.

(56) References Cited

U.S. PATENT DOCUMENTS

| 8,331,023 | B2 | 12/2012 | Wu |
| 2006/0126177 | A1* | 6/2006 | Kim et al. ..................... 359/465 |
| 2008/0231767 | A1 | 9/2008 | Lee |
| 2009/0103177 | A1 | 4/2009 | Jang et al. |

FOREIGN PATENT DOCUMENTS

| CN | 101576661 A | 11/2009 |
| CN | 101750748 A | 6/2010 |
| TW | 200746791 | 12/2007 |
| TW | 201011346 | 3/2010 |

* cited by examiner

*Primary Examiner* — Dave Czekaj
*Assistant Examiner* — Nam Pham
(74) *Attorney, Agent, or Firm* — Winston Hsu; Scott Margo

(57) ABSTRACT

A multi-view stereoscopic display includes a display panel and a parallax barrier panel. The display panel includes a plurality of scan lines, a plurality of data lines, and a plurality of pixels. The parallax barrier panel includes a plurality of barriers and a plurality of control lines. The parallax barrier panel can block the display panel for displaying a plurality of images of different view angles. Each barrier corresponds to a predetermined number of pixels of the same data line. The barriers corresponding to the same scan line are divided into a plurality of groups of barriers. The plurality of control line corresponds to the plurality of scan lines. Each control line drives a group of barriers corresponding to the same scan line.

15 Claims, 9 Drawing Sheets

MULTI-VIEW STEREOSCOPIC DISPLAY

BACKGROUND OF THE INVENTION

1. Field of the Invention

The present invention is related to a multi-view stereoscopic display, and more particularly, to a multi-view stereoscopic display that does not change the driving method of a display panel.

2. Description of the Prior Art

The principle of stereoscopic display technology is for the left and right eyes of an observer to receive different images, so images received by the left and right eyes are analyzed and superimposed by the brain of the observer to perceive gradation and depth of the display image, and experience a stereoscopic effect.

Currently, stereoscopic displays can be categorized mainly as time-sequential and spatial-multiplexed. A time-sequential stereoscopic display sequentially alternately display left eye images for the left eye and display right eye images for the right eye in a scanning manner. The observer is required to wear shutter glasses while viewing images. According to an image currently displayed, the shutter glasses sequentially allow the left eye of the observer to receive only the left eye image without seeing the right eye image, and allow the right eye of the observer to receive the right eye image only without seeing the left eye image, hence achieving the stereoscopic effect.

A spatial-multiplexed stereoscopic display mainly comprises a parallax barrier type of stereoscopic display. The parallax barrier type of stereoscopic display utilizes a parallax barrier panel disposed in front of a display panel, for the left and right eyes of the observer to be blocked by the parallax barrier due to a respective viewing angle difference, so the left and right eyes of the observer can only receive the left and right eye images respectively. Normally, a supplementary liquid crystal panel is utilized as the parallax barrier for switching between 2D/3D displaying mode. When displaying a 2D image, a second liquid crystal panel displays a bright state, for all the light passing through the first liquid crystal panel to pass through. When displaying a 3D image, the second liquid crystal panel displays alternately bright state and dark state, which is equivalent to alternating black and transparent stripes of straight lines.

Since the parallax barrier panel is driven column by column, the display panel must also be driven column by column, so as to match the parallax barrier panel. However, such driving method is inconvenient in that the display panel and the display data require new designs, and cannot utilize existing products.

SUMMARY OF THE INVENTION

Therefore, one of the objectives of the present invention is to provide a multi-view stereoscopic display, for solving the problems mentioned above.

The present invention discloses a multi-view stereoscopic display. The multi-view stereoscopic display comprises a display panel and a parallax barrier panel. The display panel comprises a plurality of scan lines, a plurality of data lines and a plurality of pixels. The parallax barrier panel overlaps the display panel for blocking the display panel to display a plurality of images of different view angles. The parallax barrier panel comprises a plurality of barriers and a plurality of control lines. Each barrier corresponds to a predetermined number of pixels of a same data line. Barriers corresponding to a same scan line are divided into a plurality of groups of barriers. The plurality of control lines correspond to the plurality of scan lines. Each control line is for driving a group of barriers corresponding to a same scan line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
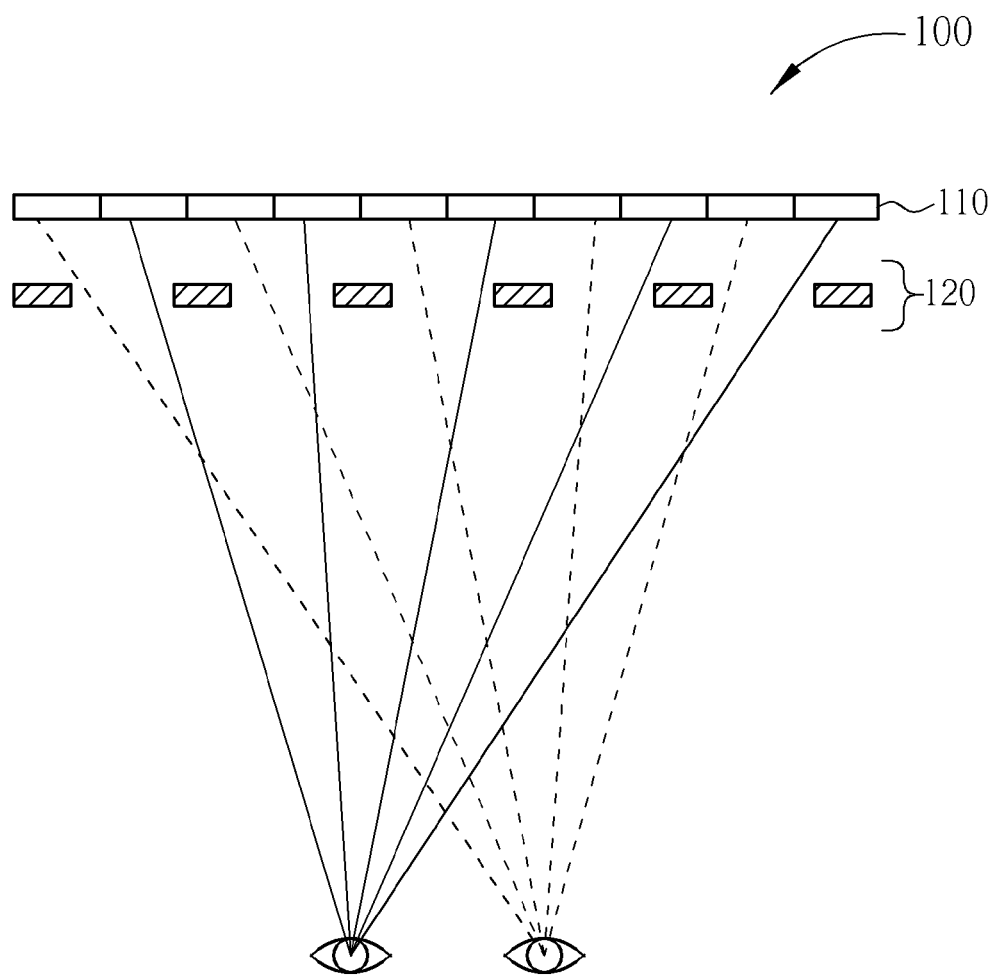
FIG. 1 is a diagram illustrating a multi-view stereoscopic display of the present invention.

Please refer to FIG. 1. FIG. 1 is a diagram illustrating a multi-view stereoscopic display of the present invention. The multi-view stereoscopic display 100 comprises a display panel 110 and a parallax barrier panel 120. In the multi-view stereoscopic display 100, the parallax barrier panel 120 is disposed in front of the display panel 110, for the display panel 110 and the parallax barrier panel 120 to overlap each other. Also, a multi-angle view effect is achieved due to the transmittance range of the parallax barrier panel 120 and the pixel arrangement of the display panel 110, for the left and right eyes of an observer to see images of different view angles due to a difference of viewing angle being blocked by the parallax barrier panel 120. The display panel 110 comprises a plurality of scan lines, a plurality of data lines and a plurality of pixels. The plurality of scan lines are crossed with the plurality of data lines. Each crossing of scan line and data line is for driving one pixel, so the plurality of pixels forms a display matrix. The parallax barrier panel 120 can block the display panel 110 to display a plurality of images of different view angles. The parallax barrier panel 120 comprises a plurality of barriers and a plurality of control lines. Each barrier corresponds to a predetermined number of pixels of a same data line (e.g. same column). The barriers corresponding to a same scan line (e.g. same row) are divided into a plurality of groups of barriers. Therefore, comparing to the prior art, the barriers of the parallax barrier panel 120 of the present invention are still arranged along the column direction, but the parallax barrier panel 120 is synchronized with the display panel 110, and can be driven along the row direction.

Figure 2:
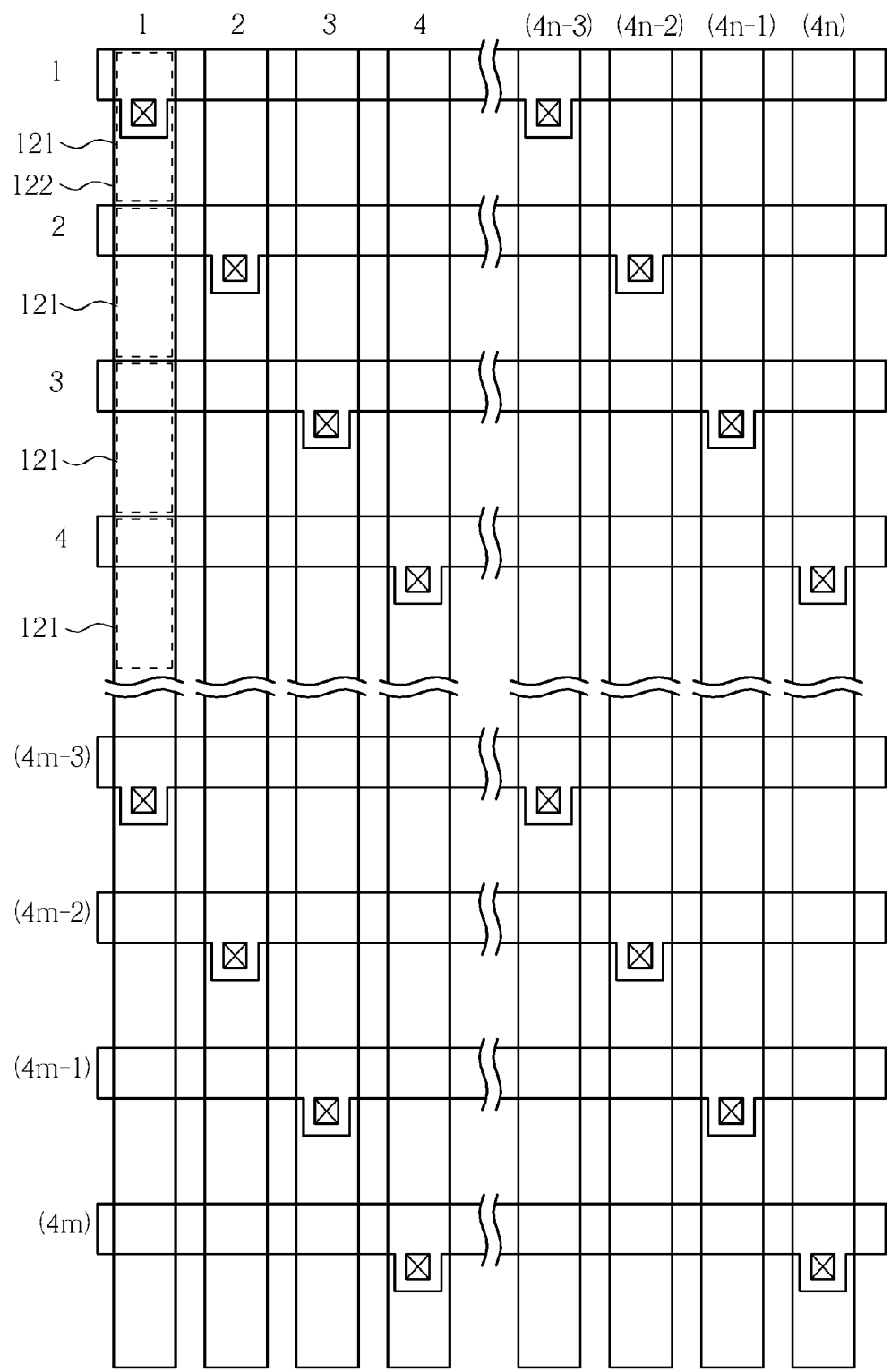
FIG. 2 is a diagram illustrating the parallax barrier panel shown in FIG. 1.

Please refer to FIG. 2. FIG. 2 is a diagram illustrating the parallax barrier panel shown in FIG. 1. In the present embodiment, the multi-view stereoscopic display 100 can display images of four different view angles, so each barrier of the parallax barrier panel 120 corresponds to four pixels 121 of a same column. Further, since the images of four different view angles are displayed in a loop, barriers 122 of a same row are divided into a first, a second, a third and a fourth group of barriers; the first group of barriers comprises barriers corresponding to 1st, 5th, ... (4n−3)th data lines; the second group of barriers comprises barriers corresponding to 2nd, 6th, ...

(4n−2)th data lines; the third group of barriers comprises barriers corresponding to 3rd, 7th, . . . (4n−1)th data lines; the fourth group of barriers comprises barriers corresponding to 4th, 8th, . . . (4n)th data lines, and n is a positive integer.

The plurality of control lines of the parallax barrier panel 120 corresponds to the plurality of scan lines of the display panel 110, and each control line is for driving a group of barriers corresponding to a same scan line. For instance, a first control line is for driving a first group of barriers corresponding to a first scan line, a second control line is for driving a second group of barriers corresponding to a second scan line, a third control line is for driving a third group of barriers corresponding to a third scan line, and a fourth control line is for driving a fourth group of barriers corresponding to a fourth scan line. Similarly, a (4m−3)th control line is for driving the first group of barriers corresponding to a (4m−3)th scan line, a (4m−2)th control line is for driving the second group of barriers corresponding to a (4m−2)th scan line, a (4m−1)th control line is for driving the third group of barriers corresponding to a (4m−1)th scan line, and a (4m)th control line is for driving the fourth group of barriers corresponding to a (4m)th scan line, and m is a positive integer.

Figure 3A:
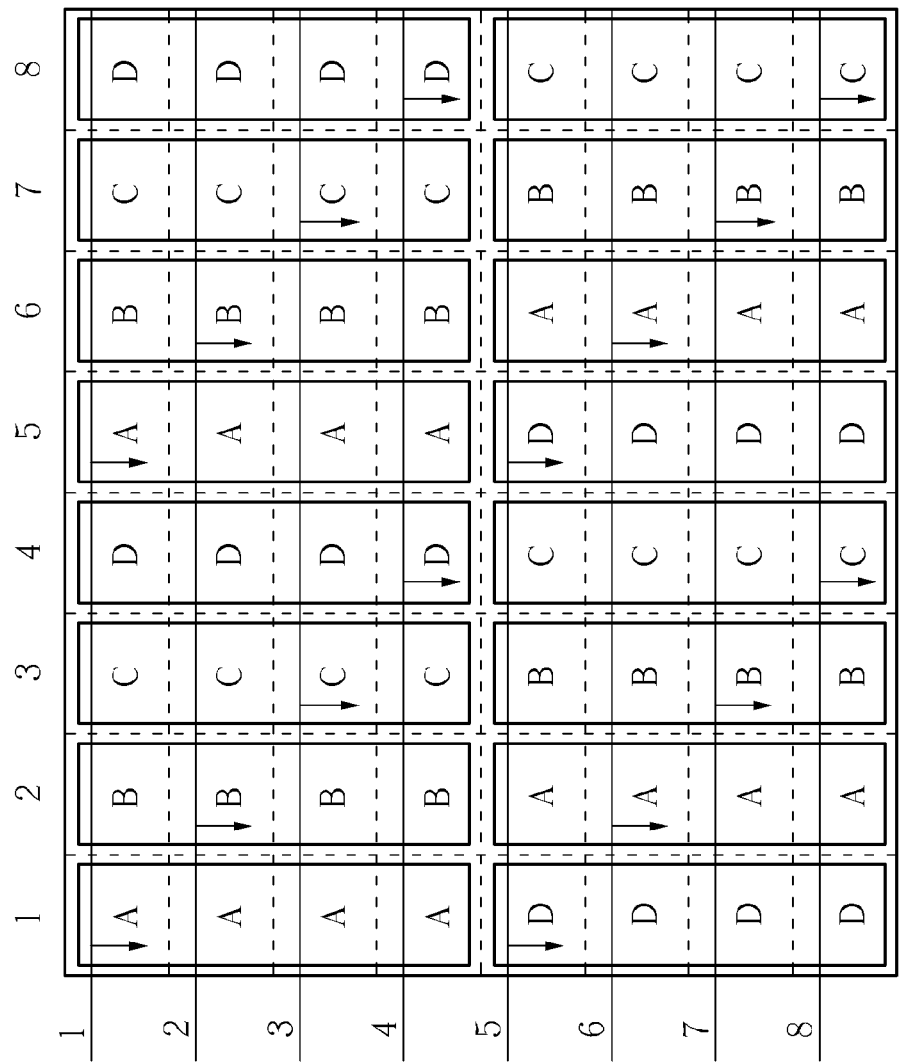
FIGS. 3A-3D are diagrams illustrating the multi-view stereoscopic display of the present invention displaying images of four angles of views.
Figure 3B:
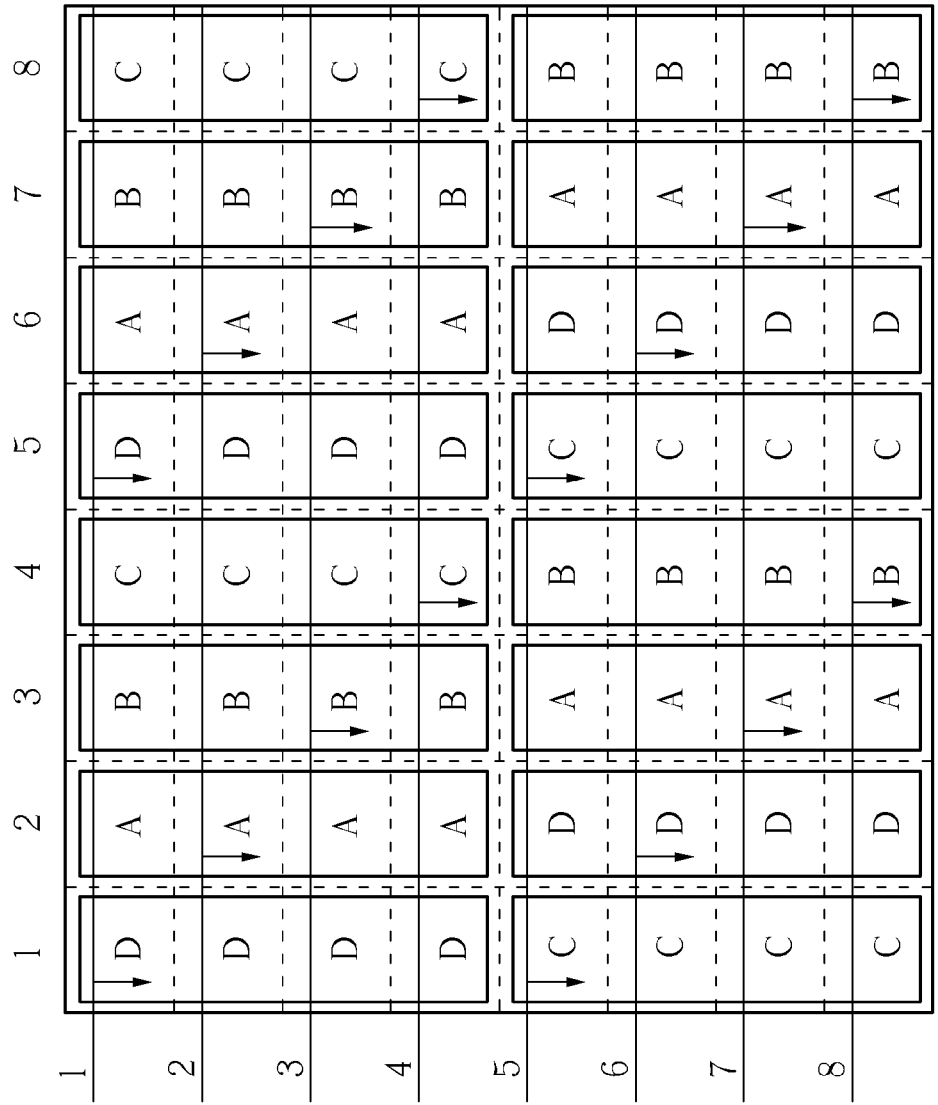
Figure 3C:
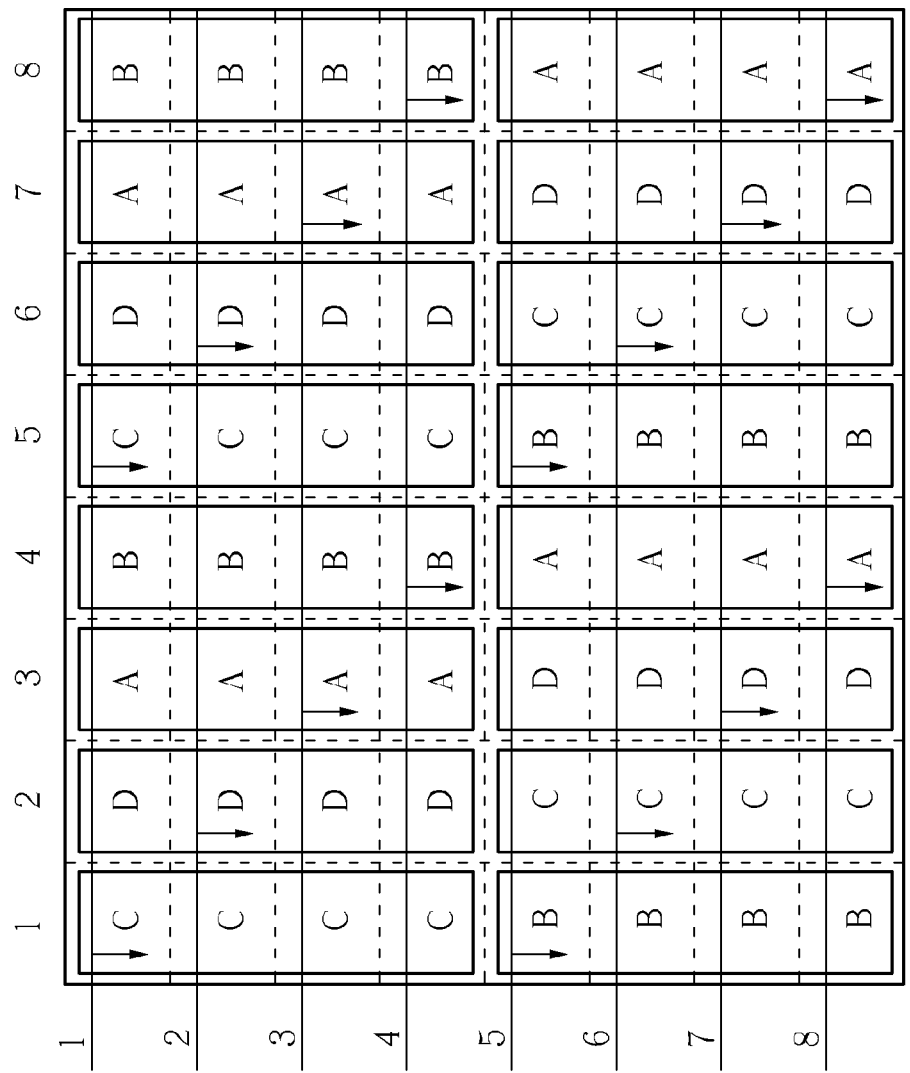
Figure 3D:
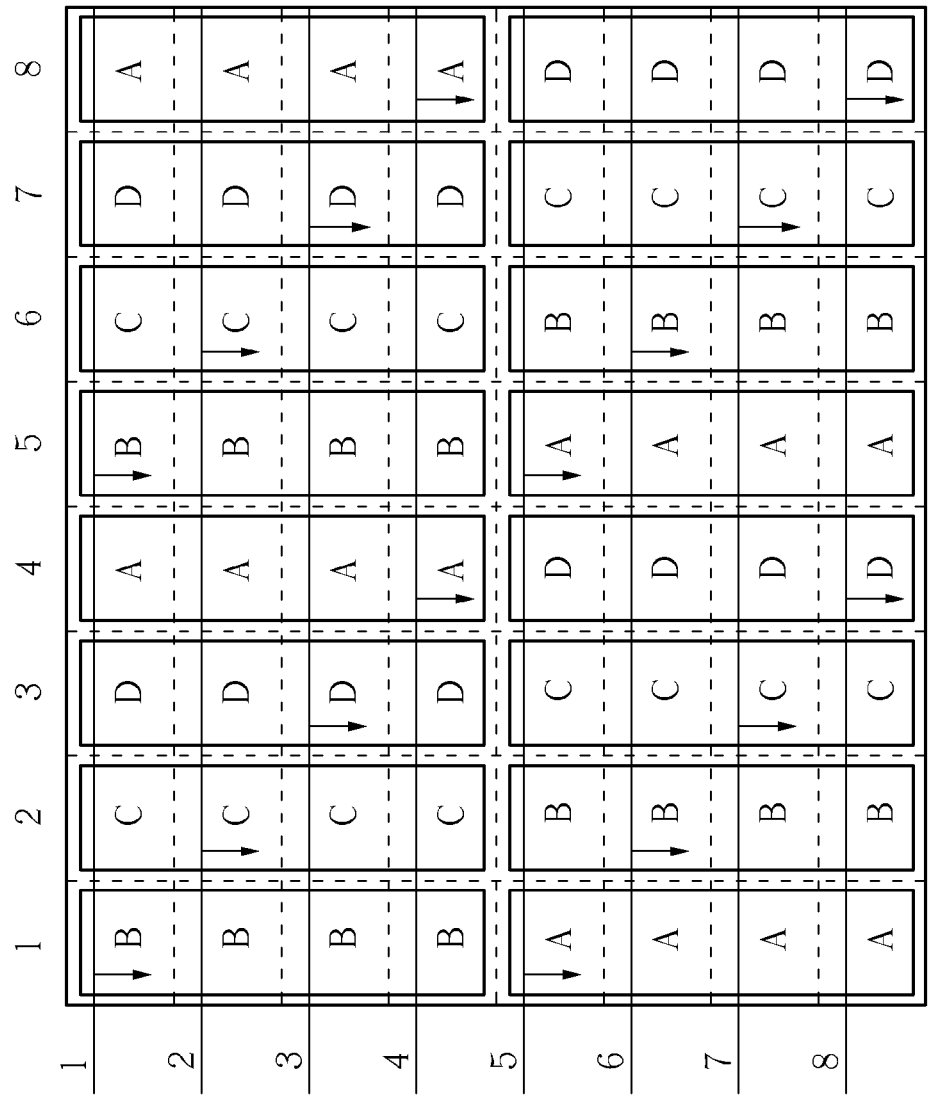
Figure 4:
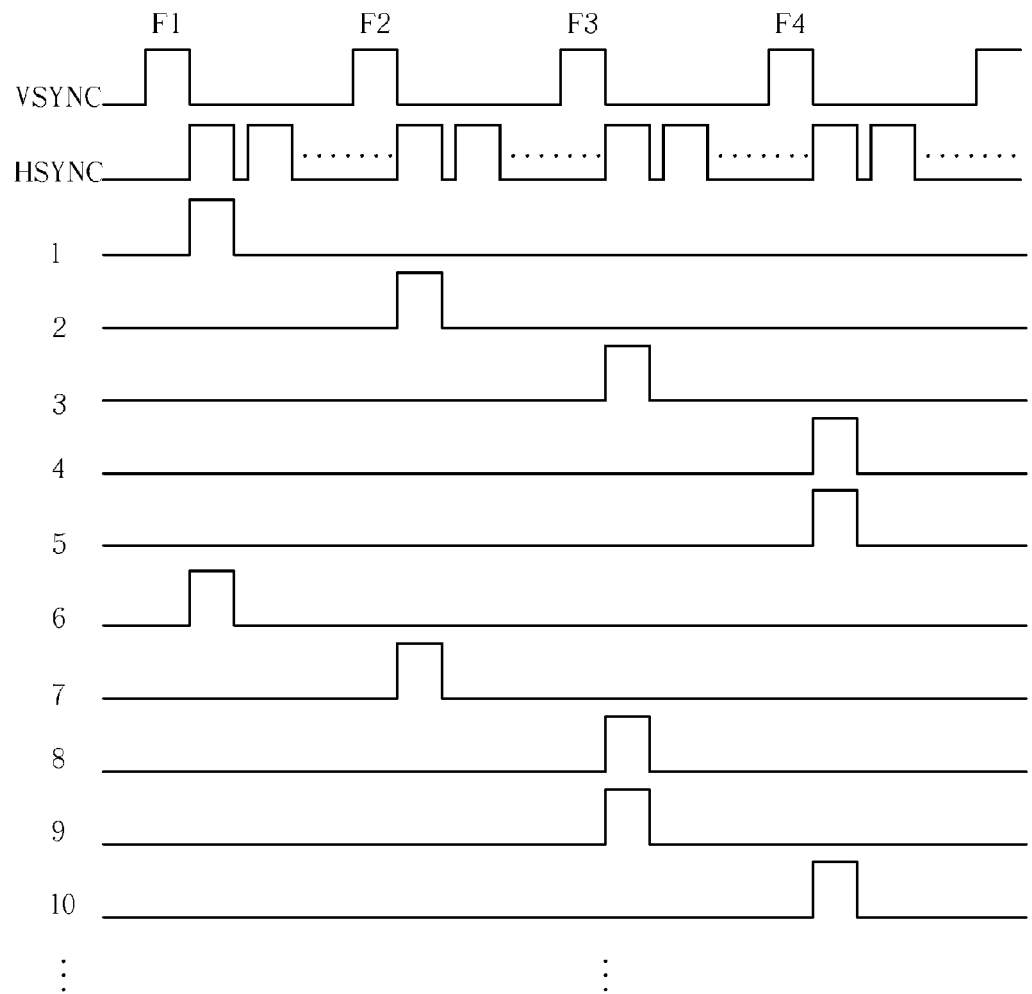
FIG. 4 is a diagram illustrating operation waveforms of control lines of the parallax barrier panel when displaying images of four angles of views.

Please refer to FIGS. 3A-3D and FIG. 4. FIGS. 3A-3D are diagrams illustrating the multi-view stereoscopic display of the present invention displaying images of four view angles. FIG. 4 is a diagram illustrating operation waveforms of control lines of the parallax barrier panel when displaying images of four view angles. When the multi-view stereoscopic display 100 displays images of four view angles, the display panel 110 displays images A, B, C, D of four view angles in a same frame period, and at the same time the parallax barrier panel 120 is driven simultaneously, for both eyes of the observer to see images of different view angles. The display panel 110 utilizes frames F1, F2, F3, F4 to display images A, B, C, D. In each frame, the resolution of images A, B, C, D is a quarter of the original resolution, so the display panel 110 can display the complete images A, B, C, D in four frames. In the frame F1, the display panel 110 displays four different view angles in an order of images A, B, C, D, as shown in FIG. 3A. In the frame F2, the display panel 110 displays four different view angles in an order of images D, A, B, C, as shown in FIG. 3B. In the frame F3, the display panel 110 displays four different view angles in an order of images C, D, A, B, as shown in FIG. 3C. In the frame F4, the display panel 110 displays four different view angles in an order of images B, C, D, A, as shown in FIG. 3D. As shown in FIGS. 3A-3D, images A, B, C, D appear sequentially in different positions of the display panel 110 in frames F1, F2, F3, F4, and a complete image is generated last. For instance, a complete image A can be generated by fusing the image A in frames F1, F2, F3, F4 together.

While the display panel 110 displays images A, B, C, D in frames F1, F2, F3, F4, the parallax barrier panel 120 is simultaneously driven as well. As shown in FIG. 4, a vertical synchronization signal VSYNC represents the frame period, and a horizontal synchronization signal HSYNC represents a driving clock for the scan lines. In the present embodiment, the parallax barrier panel 120 simultaneously turns on the corresponding barriers which display the image A. Take the 1st to the 32nd control lines for example, in a first frame F1, the parallax barrier panel 120 turns on the 1st, 6th, 11th, 16th, 17th, 22nd, 27th and 32nd control lines and turns off the 2nd to 5th, 7th to 10th, 12th to 15th, 18th to 21st, 23rd to 26th, and 28th to 31st control lines. In a second frame F2, the parallax barrier panel 120 turns on the 2nd, 7th, 12th, 13th, 18th, 23rd, 28th and 29th control lines and turns off the 1st, 3rd to 6th, 8th to 11th, 14th to 17th, 19th to 22nd, 24th to 27th and 30th to 32nd control lines. In a third frame F3, the parallax barrier panel 120 turns on the 3rd, 8th, 9th, 14th, 19th, 24th, 25th and 30th control lines and turns off the 1st, 2nd, 4th to 7th, 10th to 13th, 15th to 18th, 20th to 23rd, 26th to 29th and 31st and 32nd control lines. In a fourth frame F4, the parallax barrier panel 120 turns on the 4th, 5th, 10th, 15th, 20th, 21st, 26th and 31st control lines and turns off the 1st to 3rd, 6th to 9th, 11th to 14th, 16th to 19th, 22nd to 25th, 27th to 30th and 32nd control lines. This way, the parallax barrier panel 120 is synchronized to the image A displayed by the display panel 110.

Figure 5A:
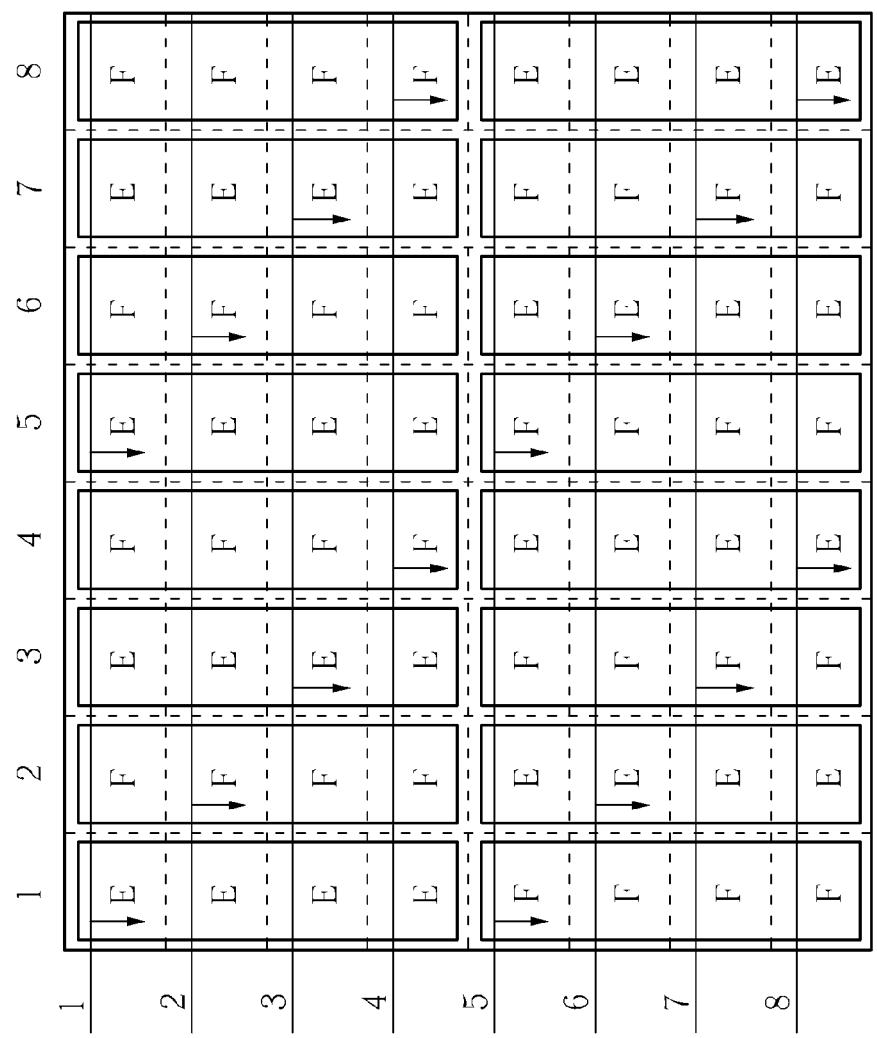
FIGS. 5A-5B are diagrams illustrating the multi-view stereoscopic display of the present invention displaying images of two angles of views.
Figure 5B:
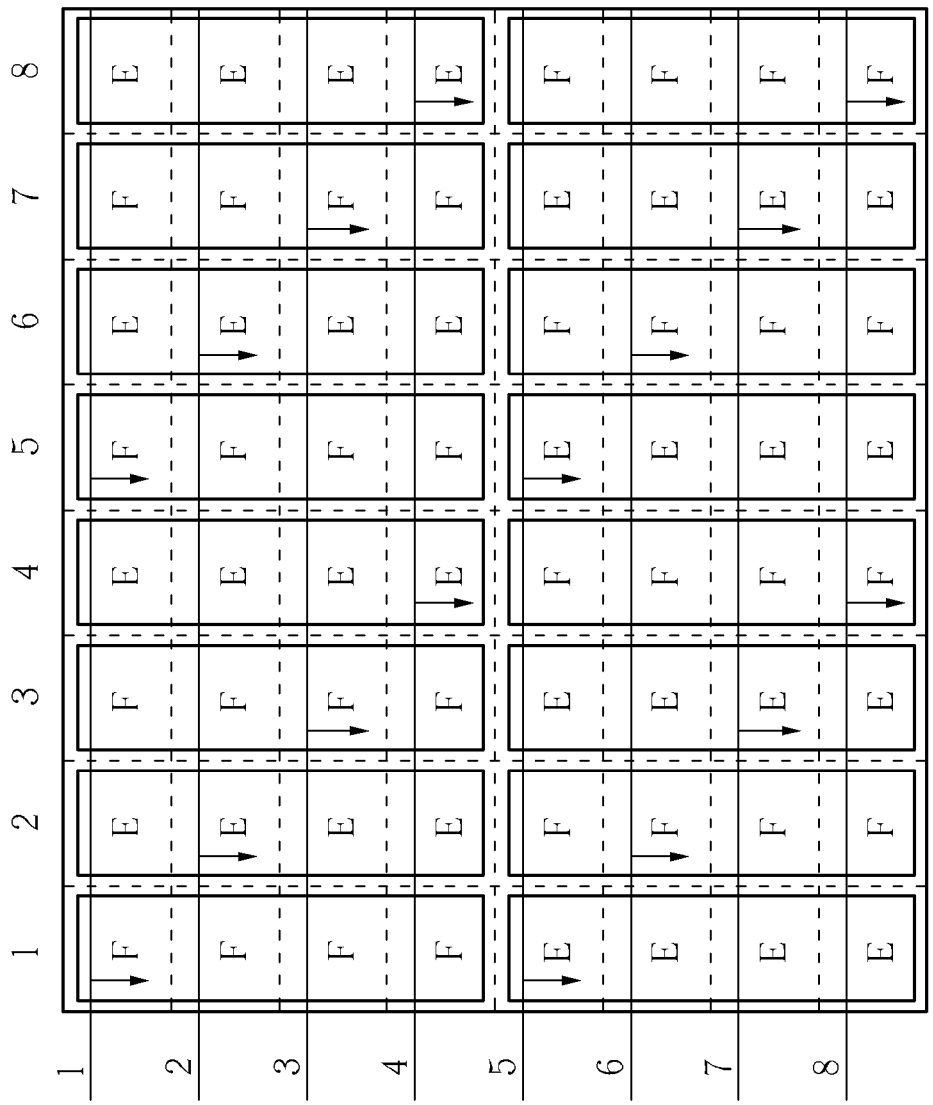

Please refer to FIGS. 5A-5B. FIGS. 5A-5B are diagrams illustrating the multi-view stereoscopic display of the present invention displaying images of two view angles. By utilizing the parallax barrier panel 120 of FIG. 2, the multi-view stereoscopic display 100 can also generate images E, F of two view angles. The display panel 110 utilizes frames F1, F2 to display images E, F. In each frame, the resolution of images E, F is half the original resolution, so the display panel 110 can display the complete images E, F in two frames. In a frame F1, the display panel 110 displays two different view angles in an order of images E, F, as shown in FIG. 5A. In a frame F2, the display panel 110 displays two different view angles in an order of images F, E, as shown in FIG. 5B.

While the display panel 110 displays images E, F in frames F1, F2, the parallax barrier panel 120 is simultaneously driven as well and turns on barriers corresponding to displaying the image E. In a first frame F1, the parallax barrier panel 120 turns on the 2nd, 4th, 5th, 7th, 10th, 12th, 13th and 15th control lines and turns off the 1st, 3rd, 6th, 8th, 9th, 11th, 14th and 16th control lines. In a second frame F2, the parallax barrier panel 120 turns on the 2nd, 4th, 5th, 7th, 10th, 12th, 13th and 15th control lines and turns off the 1st, 3rd, 6th, 8th, 9th, 11th, 14th and 16th control lines. Further, the multi-view stereoscopic display 100 can also generate 2D images by controlling the parallax barrier panel 120. When the control lines of the parallax barrier panel 120 are all turned on, the multi-view stereoscopic display 100 can generate 2D images.

In summary, the multi-view stereoscopic display of the present invention comprises a display panel and a parallax barrier panel. The display panel comprises a plurality of scan lines, a plurality of data lines, and a plurality of pixels. The parallax barrier panel comprises a plurality of barriers and a plurality of control lines. The parallax barrier panel can block the display panel for displaying a plurality of images of different view angles. Each barrier corresponds to a predetermined number of pixels of the same data line. The barriers corresponding to the same scan line are divided into a plurality of groups of barriers. The plurality of control lines corresponds to the plurality of scan lines. Each control line drives a group of barriers corresponding to the same scan line. Therefore, the barriers of the parallax barrier panel of the present invention are still arranged along the column direction, but the parallax barrier panel 120 can be synchronized with the display panel 110, and be driven along the row direction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-view stereoscopic display comprising:
  a display panel, comprising a plurality of scan lines, a plurality of data lines and a plurality of pixels, wherein the plurality of data lines and the plurality of scan lines are configured to drive the plurality of pixels; and a parallax barrier panel, the parallax barrier overlapping the display panel for blocking the display panel to display a plurality of images of different view angles, the parallax barrier panel comprising:
a plurality of barriers configured to partially block the display panel at different view angles, each barrier corresponding to a predetermined number of pixels of a same data line, and barriers corresponding to a same scan line being divided into a plurality of groups of barriers, each group of barriers having a corresponding view angle and being controlled to selectively block or display images at the corresponding view angle; and
a plurality of control lines, corresponding to the plurality of scan lines;
wherein each control line is for driving a group of barriers corresponding to a same scan line, and each scan line is for addressing a row of pixels, a (4m−3)th control line is for driving a first group of barriers corresponding to a (4m−3)th scan line, a (4m−2)th control line is for driving a second group of barriers corresponding to a (4m−2)th scan line, a (4m−1)th control line is for driving a third group of barriers corresponding to a (4m−1)th scan line, and a (4m)th control line is for driving a fourth group of barriers corresponding to a (4m)th scan line, and m is a positive integer.

2. The multi-view stereoscopic display of claim 1, wherein the plurality of control lines are driven simultaneously according to the plurality of scan lines.

3. The multi-view stereoscopic display of claim 1, wherein the barriers corresponding to the same scan line are divided into the plurality of groups of barriers according to a number of the images of different view angles.

4. The multi-view stereoscopic display of claim 1, wherein when the parallax barrier panel blocks the display panel to display an image of a first view angle, an image of a second view angle, an image of a third view angle and an image of a fourth view angle, each barrier corresponds to four pixels of the same data line, and the barriers corresponding to the same scan line are divided into the first group of barriers, the second group of barriers, the third group of barriers and the fourth group of barriers.

5. The multi-view stereoscopic display of claim 4, wherein the first group of barriers comprises barriers corresponding to a (4n−3)th data line, the second group of barriers comprises barriers corresponding to a (4n−2)th data line, the third group of barriers comprises barriers corresponding to a (4n−1)th data line, and the fourth group of barriers comprises barriers corresponding to a (4n)th data line, and n is a positive integer.

6. The multi-view stereoscopic display of claim 5, wherein the parallax barrier panel turns on 1st, 6th, 11th, 16th, 17th, 22nd, 27th and 32nd control lines and turns off 2nd to 5th, 7th to 10th, 12th to 15th, 18th to 21st, 23rd to 26th, and 28th to 31st control lines in a first frame.

7. The multi-view stereoscopic display of claim 5, wherein the parallax barrier panel turns on 2nd, 7th, 12th, 13th, 18th, 23rd, 28th and 29th control lines and turns off 1st, 3rd to 6th, 8th to 11th, 14th to 17th, 19th to 22nd, 24th to 27th and 30th to 32nd control lines in a second frame.

8. The multi-view stereoscopic display of claim 5, wherein the parallax barrier panel turns on 3rd, 8th, 9th, 14th, 19th, 24th, 25th and 30th control lines and turns off 1st, 2nd, 4th to 7th, 10th to 13th, 15th to 18th, 20th to 23rd, 26th to 29th and 31st and 32nd control lines in a third frame.

9. The multi-view stereoscopic display of claim 5, wherein the parallax barrier panel turns on 4th, 5th, 10th, 15th, 20th, 21st, 26th and 31st control lines and turns off 1st to 3rd, 6th to 9th, 11th to 14th, 16th to 19th, 22nd to 25th, 27th to 30th and 32nd control lines in a fourth frame.

10. The multi-view stereoscopic display of claim 1, wherein the plurality of data lines and the plurality of scan lines are crossed to form a display matrix, barriers corresponding to the same data line are the barriers of a same column, and barriers corresponding to the same scan line are the barriers of a same row.

11. The multi-view stereoscopic display of claim 1, wherein when the parallax barrier panel blocks the display panel to display an image of a first view angle and an image of a second view angle, each barrier corresponds to four pixels of the same data line, and the barriers corresponding to the same scan line are divided into the first group of barriers, the second group of barriers, the third group of barriers and the fourth group of barriers.

12. The multi-view stereoscopic display of claim 11, wherein the first group of barriers comprises barriers corresponding to a (4n−3)th data line, the second group of barriers comprises barriers corresponding to a (4n−2)th data line, the third group of barriers comprises barriers corresponding to a (4n−1)th data line, and the fourth group of barriers comprises barriers corresponding to a (4n)th data line, and n is a positive integer.

13. The multi-view stereoscopic display of claim 12, wherein the parallax barrier panel turns on 1st, 3rd, 6th, 8th, 9th, 11th, 14th and 16th control lines and turns off 2nd, 4th, 5th, 7th, 10th, 12th, 13th, 15th control lines in a first frame.

14. The multi-view stereoscopic display of claim 13, wherein the parallax barrier panel turns on 2nd, 4th, 5th, 7th, 10th, 12th, 13th and 15th control lines and turns off 1st, 3rd, 6th, 8th, 9th, 11th, 14th and 16th control lines in a second frame.

15. The multi-view stereoscopic display of claim 12, wherein the parallax barrier panel turns on 2nd, 4th, 5th, 7th, 10th, 12th, 13th and 15th control lines and turns off 1st, 3rd, 6th, 8th, 9th, 11th, 14th and 16th control lines in a second frame.

* * * * *